United States Patent [19]

Traugott et al.

[11] Patent Number: 4,885,339
[45] Date of Patent: Dec. 5, 1989

[54] POLYPHENYLENE ETHER/POLYSTYRENE BLENDS

[75] Inventors: Thomas D. Traugott; Eugene R. Moore; Michael T. Malanga, all of Midland, Mich.

[73] Assignee: The Dow Chemical Company, Midland, Mich.

[21] Appl. No.: 240,844

[22] Filed: Sep. 2, 1988

Related U.S. Application Data

[62] Division of Ser. No. 124,540, Nov. 23, 1987, Pat. No. 4,804,712.

[51] Int. Cl.$^4$ ............................................. C08L 71/04
[52] U.S. Cl. .................................... 525/132; 525/905
[58] Field of Search ................. 525/152, 905, 132, 92

[56] References Cited

U.S. PATENT DOCUMENTS 4,284,733  8/1981  Russo ................................. 525/152

Primary Examiner—Jacob Ziegler
Attorney, Agent, or Firm—Price, Heneveld, Cooper DeWitt & Litton

[57] ABSTRACT

Blends of polyarylene ether resins and anionically-polymerized monovinylidene aromatic compounds having a molecular weight distribution not greater than 1.8 are characterized by a lowered melt viscosity without significant loss in mechanical properties. The incorporation of elastomeric toughening agents does not significantly negatively affect processability or other properties of the blends.

8 Claims, No Drawings

POLYPHENYLENE ETHER/POLYSTYRENE BLENDS

This is a division of application Ser. No. 07/124,540, filed Nov. 23, 1987, now U.S. Pat. No. 4,804,712.

BACKGROUND OF THE INVENTION

This invention relates to blends of polyarylene ether resins and monovinylidene aromatic polymers such as polystyrene.

Polyarylene ether resins are well-known articles of commerce. These polymeric materials are thermoplastic engineering resins available in a variety of molding and extrusion grades. They combine high heat, flame retardancy and high impact properties with one of the lowest moisture absorption rates in engineering resins. The polyarylene ether resins are known for their (1) excellent mechanical properties, such as tensile strength, (2) electrical properties such as volume inherent resistivity and dielectric strength, and (3) high heat distortion temperature. However, they are difficult to process because of their high melt viscosity and high softening point, coupled with a low resistance to oxidation with heat.

Improvements in processability of polyarylene ether compositions have been obtained by blending with other resins, but usually at the expense of other properties. Polystyrene has been the most widely used blend material, because the polystyrene and the polyarylene ether, unlike most mixtures of polymeric materials, are substantially completely compatible to the extent that blends of these two polymers form true alloys and retain much of their base resin properties. For example, the blends have a single glass transition temperature $T_g$, which is the temperature at which an amorphous material such as glass or high polymer changes from a brittle, vitrious state to a plastic state. The tensile strength, heat deflection temperature, melt viscosity and other physical properties of the polyarylene ether-polymonovinylidene aromatics are a weighted average of the values corresponding to the individual components.

In addition to the use of polystyrene as a modifier for polyarylene ether resins, polyamides (U.S. Pat. No. 3,379,792), polyolefins (U.S. Pat. No. 3,351,851), rubber-modified styrene resins (U.S. Pat. Nos. 3,383,435 and 3,959,211 and Ger. Offen. No. 2,047,613), and mixtures of polystyrene and polycarbonate (U.S. Pat. Nos. 3,933,941 and 4,446,278) have been proposed as suitable modifiers for polyarylene ether resins.

SUMMARY OF THE INVENTION

In the present invention, a surprising improvement in processability of a polyarylene ether blend is achieved without sacrificing strength and other properties by blending:

from 5 to 95, preferably 20 to 60, percent by weight of at least one polyarylene ether;

from 95 to 5, preferably 80 to 40, percent by weight of at least one anionically polymerized monovinylidene aromatic compound, said polymerized monovinylidene aromatic compound having a weight average molecular weight of at least 50,000 and a molecular weight distribution not greater than 1.8.

The compositions of this invention can also optionally contain from 5 to 40, preferably 10 to 30, percent by weight of at least one natural or synthetic elastomeric material. Other conventional additives such as stabilizers, flame retardants, inorganic fillers, and the like, can be added to the moldable compositions of this invention.

The readily moldable blends of polymeric materials of this invention retain the excellent heat resistance characteristics of the polyarylene ethers and their flame retardancy and, even though the melt viscosity of the blend is significantly lower than that of the other polymer alone, the blends suffer no significant loss in flexural strength in comparison to blends of polyarylene ethers and polymers of vinylidene aromatic monomers in which the monovinylidene aromatic polymer is not anionically prepared and has a molecular weight distribution different from that of the invention blend. In addition, the incorporation of elastomeric materials into the invention compositions increases the toughness without signifcantly negatively affecting processability or other properties of the resulting blends.

DESCRIPTION OF THE PREFERRED EMBODIMENT

In forming the novel blends of this invention, there can be employed substantially any of the family of polymeric materials known in the art as polyarylene ether resins made by any of the known catalytic or noncatalytic processes from the corresponding phenol or its reaction derivatives. The polyarylene ether resins are composed by the repeating structural unit:

Wherein A is an aromatic nucleus and n is an integer of at least 10. The aromatic nucleus can be either substituted or unsubstituted. Thus A can be, for example, phenylene, chlorophenylene, naphthalene and tolylene. Particularly preferred are 2,6-dimethyl-1,4-phenylene, 2-methyl-6-ethyl-1,4-phenylene, and 2,6-diethyl-1,4-phenylene and 2,3,6-trimethyl-1,4-phenylene. Especially preferred at the current time are poly (2,6-dimethyl-1,4-phenylene) ether and the copolymer obtained by the polymerization of 2,6-dimethyl phenol and 2,3,6-trimethyl phenol, with the former being most preferred.

The polymers of vinylidene aromatic compounds which are suitable for use in forming the blends of the present invention can be substantially any anionically polymerized vinylidene aromatic polymer or copolymer compound having a weight average molecular weight of at least 50,000, preferably in the range of 50,000 to 500,000, and preferentially in the range from 100,000 to 300,000; and a molecular weight distribution (Mw/Mn, which is weight average molecular weight divided by number average molecular weight) not greater than 1.8, preferably not greater than 1.5 and preferentially in the range from 1.0 to 1.3. Most preferably, at least 80% of the polymerized monovinylidene aromatic compound has a molecular weight within ±30% of the weight average molecular weight of the compound. The compound preferably has a total dimer and trimer content less than 1,000 parts per million. The term monovinylidene aromatic polymer as used herein includes both homopolymers of vinylidene aromatic monomers and copolymers of such monomers and compounds which are polymerizable therewith. Hereinafter, in both the specification and the claims, the term "monovinylidene aromatic" will be referred to as "MVA". Suitable monomers, including nonvinylidene aromatic monomers which are copolymerizable with the MVA monomers, include styrene, alphamethylstyrene, para-isopropanolstoluene, vinyltoluene, dimethylstyrene, t-butylstyrene, vinylnaphthalene, acrylonitrile and methylmethacrylate. The preferred MVA polymeric compounds are the homopolymers of styrene and copolymers of styrene and alphamethylstyrene, with homopolymers of styrene being especially preferred.

Processes for anionic polymerization of MVA monomers are typically not employed for commercially producing MVA polymers. In the broadest sense, the polymerization to obtain polymeric material suitable for use in the present invention comprises mixing a solution of an anionic catalyst into a solution of anionically-polymerizable MVA monomer, and initiating the polymerization reaction and permitting it to proceed to completion, i.e., complete reaction of the polymerizable monomer feed stock.

Substantially any anionic catalyst capable of initiating polymerization of MVA monomers can be employed in making MVA polymers for use in the invention. Such catalysts are already known to the art and usually comprise ion-radical adducts and alkaline metal salts of very weak acids. The ion-radical adducts are 1:1 adducts of an alkaline metal such as lithium, sodium, potassium, rubidium or cesium, and an organic compound capable of forming an ion-radical adduct therewith such as polycyclic aromatic hydrocarbons and alkyl derivatives thereof, including naphthalene, methylnaphthalene, anthracene, phenanthrene, and the like; and aromatic ketones, including benzophenone and acetophenone. The alkaline metal salts are the lithium, sodium, potassium, rubidium and cesium salts of very weak acids having a pKa value greater than about 27, e.g., xanthane, phenylxanthane, diphenyl-biphenylmethane, triphenylmethane, diphenyl-alpha-naphthylmethane, diphenylmethane, diphenylmethylethylene and cumene.

The catalysts are typically used in the form of solutions containing about 70 to 99.5% of an inert nonpolar solvent, such as cyclohexane, optionally containing up to about 20% by weight of an inert polar solvent, based on the weight of the catalyst, and preferably containing a higher proportion of solvent for ease of operation in conducting the polymerization. Suitable polar solvents include 1,2-dimethoxyethane, 1, 2-diethoxyethane, tetrahydrofuran, dioxane, dioxolane, carbitol ethers, cellosolve ethers, aliphatic ethers such as dimethyl ether and diethyl ether, cycloaliphatic ethers such as methoxycyclohexane and aromatic ethers such as diphenyl ether.

The solvents in which the MVA monomers can be dissolved to form the monomer solutions are inert organic solvents such as the polar solvents previously mentioned for the catalyst and nonpolar solvents such as aromatic hydrocarbons and alkyl derivatives thereof, including benzene, toluene, xylenes, ethylbenzene, diphenyl and the like; cycloaliphatic hydrocarbons and alkyl derivatives thereof, including cyclohexane and methylcyclohexane; saturated aliphatic hydrocarbons containing from 2 to 30 carbon atoms such as butane, pentane, hexane, octane, dodecane and octodecane; and aliphatic olefins which are nonpolymerizable in the system such as propane and butene.

The anionic polymerization of the MVA monomers is preferably accomplished in an inert atmosphere. A very pure monomer feed stock substantially free of water, oxygen, carbon dioxide, Lewis acids and other impurities is required. Accordingly, the monomer feed stock (which can be diluted in solvent) is heated and sprayed into a vacuum chamber of dry nitrogen is bubbled through the feed stock solution to remove carbon dioxide, oxygen and water. The thus treated feed stock is passed over an activated alumina bed and then passed to a hydrogenation unit where any phenylacetylene in the feed stock is reduced to styrene monomer.

The purified monomer feed stock, diluted with a suitable solvent such as ethylbenzene, is cooled to a temperature below 25° C., preferably below 20° C., and charged to a clean reaction zone which is at a temperature below 25° C., preferably below 20° C. The monomer-solvent solution typically contains from 20 to 60, preferably 20 to 35, percent monomer. With the entire monomer charge in the reaction zone, the initiator or catalyst solution, for example, 15% solution of n-butyllithium in cyclohexane, is introduced. The temperature of the reaction zone is maintained below 25° C. during the addition of the initiator. This enables the initiator to react with any impurities in the system without simultaneously initiating the polymerization of the MVA monomer and insures more uniform polymerization of the monomer. The initiator is uniformly dispersed throughout the cooled monomer feed stock and substantially instantaneously reacts with impurities which may be present. Once addition and dispersion of initiator solution is completed and the initiator has had an opportunity to react with any impurities, the temperature of the reaction zone is raised above 25° C., preferably to a temperature in the range of 35° to 45° C. Propagation begins and the polymerization reaction proceeds exothermically. Upon completion of the polymerization reaction, a reaction terminator, such as methanol, is added to the polymer-solvent mixture and the mixture is devolatilized. Alternatively, a suitable narrow molecular weight distribution polystyrene resin can be made in a system where the polymerization rate is controlled by continuous addition of a monomer or a monomer solvent stream that has been purified as above. Preferably, this stream is additionally treated with a small amount of N-butyllithium (NBL). The NBL addition must be carefully made so that any remaining impurities are reacted with minimal or preferably no excess normal butyl lithium. A second alternative is to produce said polymer in a continuous reactor type which is plug flow in nature. Here, all the initiator is introduced initially and the monomer either introduced all with the initiator or introduced incrementally.

Production controls should be maintained such that the quality of residual monomers and residual low molecular weight impurities in the MVA polymer are maintained relatively low. The total dimer and trimer content should be less than 1,000 parts per million and preferably less than 300 parts per million. This compares with the typical prior art MVA polymers which have residual dimers and trimers of 3,000 to 15,000 parts per million. The residual monomer level should be less than 200 parts per million and preferably less than 100 parts per million, in comparison to typical prior art commercial polymers having 300 to 800 parts per million residual monomer.

Initially, the reaction mixture prior to polymerization usually contains about 10 to 55% by weight of monomer, based on the total weight of solvent in the monomer solution and the weight of solvent in the catalyst solution. The amount of catalyst employed is dependent upon the molecular weight desired for the product, the average molecular weights of the polymers being proportional to the reciprocal of the catalyst concentration. Usually, the reaction mixture contains about 0.05 to 1% by weight of catalyst, based on the weight of monomer.

Advantageously, the polymerization is conducted by batch process techniques with the monomer and catalyst solutions being mixed prior to increasing the temperature above about 35° C. where propagation takes place.

The inclusion of elastomeric materials in the polymer blend including graft elastomeric material can beneficially enhance the toughness of the molded compositions without otherwise having a significant deleterious effect on the other desired properties. Substantially any of the known elastomeric materials, e.g., natural and synthetic rubbers, including graft rubbers, can be employed. Particularly preferred elastomeric materials are the rubber-modified polystyrene graft rubbers made with diene rubbers, such as butadiene rubber, styrene-butadiene rubber, butyl rubber, acrylonitrile rubber, ethylene-propylene rubbers and ethylene-propylene-diene (EPDM) rubbers. Generally, such compounds, when utilized will be employed at levels not exceeding about 45 parts by weight, per 100 parts of combined weight of polyarylene ether, vinylidene aromatic polymer and elastomer, and preferably will be employed in the range from about 10 to about 30 parts by weight.

The invention compositions can also include pigments, fillers, flame retardants and other additives typically present in molding compositions.

The molding compositions of this invention are prepared by conventional methods such as blending by an extruder or other methods well known in the art.

The invention is illustrated in greater detail by the following examples, but these examples are not to be construed as limiting the present invention. All parts, percentages and the like are in parts by weight, unless otherwise indicated.

EXAMPLE 1

Preparation Of A Suitable Anionic Polymer

Suitable anionic polymers were prepared on lab and pilot plant scale to a residual monomer content of below 10 ppm. A scaled up procedure is illustrated in Example 1. To prepare the anionic polymer on a commercial scale, sixty thousand pounds of feed stock comprising 33.3% styrene and 66.7% ethylbenzene are heated and sprayed into a vacuum chamber to remove dissolved gases including $CO_2$ and $O_2$; cooled to ambient temperature, passed through a bed of activated alumina and hydrogenated with a selective catalyst for phenylacetylene until the phenylacetylene content is reduced below 2 ppm.

The purified feed mixture is chilled to 20° C. and introduced into a clean stainless steel reactor in which the reaction zone is at a temperature of 20° C.

With the feed mixture in the reaction zone at a temperature of 20° C., 56.2 pounds of a 15% solution of n-butyllithium in cyclohexane is added. The reactor is heated at a rate of 5° C. per minute to 35° C., at which temperature a rapid exotherm begins. Ten minutes after adding the initiator, the temperature of the polymerization reactor will peak at about 133° C. and then begin to cool. During the reaction, some ebullient cooling was allowed with condensate returning directly to the reactor.

The 60,000 pounds of completely polymerized mixture are pumped through a mixer at a constant rate. Methanol terminating agent (4.5 pounds total) is simultaneously continuously metered into the mixer.

After termination, the polymer solution is passed through a heat exchanger to a surge tank which is maintained at a reduced pressure equivalent to the boiling point of the ethylbenzene-cyclohexane solvent in a 50% polystyrene solution. The heat from the exchanger and the reduced pressure in the surge tank vaporize one-half of the solvent load and increase the polymer solids content in the remaining solution to 50%. The remaining solution is passed through a two-stage devolatilization system comprising a first stage heat exchanger operated at 430 mm Hg total pressure and a jacket temperature of 170° C. and a second stage heat exchanger (jacket temperature of 250° C.) into a vacuum chamber maintained at 11 mm Hg total pressure.

The polymer is pumped through a multi-orifice stranding die into a water bath cooler and then through a cutter. The average polymer collection rate will be 11,500 lbs./hr. The polystyrene product will have a residual monomer content below 10 ppm.

EXAMPLE 2

Comparison Of Blends Of The Present Invention With Prior Art Blends

The materials used in the comparative alloying study are:

1. Narrow distribution polystyrene [PS-ND]: $M_w$=189,000, $M_n$=162,000, $M_w/M_n$=1.17. (Prepared following the procedure of Example 1).
2. Commercial grade polystyrene [PS-CG]: $M_w$=300,000, $M_n$=130,000, $M_w/M_n$=2.31.
3. Poly (2, 6-dimethyl-1, 4-phenylene ether) [PPO]: $M_w$=78,900, $M_n$=29,800.
4. Polystyrene-butadiene graft rubber [SBGR]: % PBD=53.
   % Agglomeration=42
   Dv (large particles)=1.0 micron
   Graft/Rubber=0.5
   Graft $M_w$=180,000

The resins were weighed out, tumble mixed and dried at 80° C. for 16 hours.

The blends were compounded on a 0.8 inch W.E. twin screw extruder operating at these conditions:

| Zone | 1 | 2 | 3 | 4 | 5 | 6 |
|---|---|---|---|---|---|---|
| Temp (°C.) | 230 | 240 | 250 | 260 | 270 | 280 |
| RPM = 250 | | | Double Pass | | | |

The pellets were again dried and compression molded at 450° F. then tested according to ASTM standards. These blend properties were found:

| | 1 (invention) | 2 (prior art) | 3 (invention) | 4 (prior art) |
|---|---|---|---|---|
| % PPO | 40 | 40 | 32.3 | 32.3 |
| % PS-CG | — | 60 | — | 48.5 |
| % PS-ND | 60 | — | 48.5 | — |
| % SBGR | — | — | 19.2 | 19.2 |
| Fm (psi) | $4.57 \times 10^5$ | $4.57 \times 10^5$ | $3.69 \times 10^5$ | $3.58 \times 10^5$ |
| Fs (psi) | 16,900 | 17,400 | 13,300 | 12,900 |
| Vicat (°F.) | 270 | 277 | 272 | 274 |
| Izod (ft-lb/in) | — | — | 3.27 | 3.05 |
| Viscosity* (poise) | 22,450 | 54,730 | 27,570 | 57,840 |

*287.75° C., 1 rad/sec

The data clearly demonstrates the surprising and unexpected benefits which the present invention provides. For example, invention blend 1 when compared to noninvention blend 2 clearly demonstrates a significant reduction in melt viscosity of the blends without any significant deleterious effect upon other properties, especially flexural strength Fs. Invention blend 3 in comparison to noninvention blend 4 demonstrates not only the significant reduction in melt viscosity, but the increased toughening which the rubber additive provides with no significant reduction in other properties.

While this invention has been described in detail for the purpose of illustration, it is not to be limited thereby, but it is intended to cover all changes and modifications within the spirit and scope thereof.

The embodiments of the invention in which the exclusive property or privilege is claimed are defined as follows:

1. A molding composition comprising:
   from 5 to 95% by weight of at least one arylene ether polymeric material;
   from 95 to 5% by weight of at least one anionically polymerized vinylidene aromatic compound, said polymerized vinylidene aromatic compound having a weight average molecular weight of at least 50,000; and
   a molecular weight distribution not greater than 1.8.

2. A molding composition in accordance with claim 1, wherein the molecular weight distribution of said polymerized vinylidene aromatic compound is in the range from 1.0 to 1.3.

3. A molding composition in accordance with claim 1, wherein the weight average molecular weight of said polymerized vinylidene aromatic compound is in the range from 50,000 to 500,000 and said molecular weight distribution is not greater than 1.5.

4. A molding composition in accordance with claim 3, wherein the molecular weight distribution of said polymerized vinylidene aromatic compound is in the range from 1.0 to 1.3, at least 80% of said polymerized vinylidene aromatic compound has a molecular weight which is within ±30% of the weight average molecular weight of said polymerized vinylidene aromatic compound and the total dimer and trimer content of said polymerized vinylidene aromatic compound is less than 1000 ppm and the residual monomer level is less than 200 ppm.

5. A molding composition in accordance with claim 1, wherein said arylene ether polymeric material is polyphenylene ether and said polymerized vinylidene aromatic compound is polystyrene.

6. A molding composition in accordance with claim 5, wherein the molecular weight distribution of said polymerized vinylidene aromatic compound is in the range from 1.0 to 1.3.

7. A molding composition in accordance with claim 5, wherein the weight average molecular weight of said polymerized vinylidene aromatic compound is in the range from 50,000 to 500,000 and the molecular weight distribution is not greater than 1.5.

8. A molding composition in accordance with claim 7, wherein the molecular weight distribution of said polymerized vinylidene aromatic compound is in the range from 1.0 to 1.3, at least 80% of said polymerized vinylidene aromatic compound has a molecular weight which is within ±30% of the weight average molecular weight of said polymerized vinylidene aromatic compound and the total dimer and trimer content of said polymerized vinylidene aromatic compound is less than 1000 ppm and the residual monomer level is less than 200 ppm.

* * * * *

UNITED STATES PATENT AND TRADEMARK OFFICE
CERTIFICATE OF CORRECTION

PATENT NO.  : 4,885,339

DATED       : December 5, 1989

INVENTOR(S) : Thomas D. Traugott, Eugene R. Moore and Michael T. Malanga

It is certified that error appears in the above-identified patent and that said Letters Patent is hereby corrected as shown below:

Column 2, line 6, "others" should correctly appear as --ethers--.

Column 2, line 17, "signifcantly" should correctly appear as --significantly--.

Column 3, line 67, "of" should correctly appear as --or--.

Signed and Sealed this

Fifteenth Day of January, 1991

Attest:

HARRY F. MANBECK, JR.

*Attesting Officer*  *Commissioner of Patents and Trademarks*